(12) United States Patent
Lima

(10) Patent No.: US 9,109,114 B2
(45) Date of Patent: *Aug. 18, 2015

(54) POLYAMIDES HAVING IMPROVED ANTI-DELAMINATION

(71) Applicant: E I DU PONT DE NEMOURS AND COMPANY, Wilmington, DE (US)

(72) Inventor: Avelino F Lima, North Hills, WV (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/832,130

(22) Filed: Mar. 15, 2013

(65) Prior Publication Data

US 2014/0088253 A1    Mar. 27, 2014

Related U.S. Application Data

(60) Provisional application No. 61/706,254, filed on Sep. 27, 2012.

(51) Int. Cl.
| | | |
|---|---|---|
| C08L 77/06 | (2006.01) | |
| B29C 45/00 | (2006.01) | |
| C08J 11/06 | (2006.01) | |

(52) U.S. Cl.
CPC ............... *C08L 77/06* (2013.01); *B29C 45/00* (2013.01); *C08J 11/06* (2013.01); *C08J 2377/02* (2013.01); *C08L 2205/025* (2013.01); *C08L 2205/03* (2013.01)

(58) Field of Classification Search
CPC ... C08L 77/06; C08L 51/06; C08L 2205/025; C08L 2205/03; B29C 45/00; C08J 11/06; C08J 2377/06; C08K 3/04

USPC ............. 521/40, 49.8; 524/504, 538; 525/66; 264/328.1

See application file for complete search history.

(56) References Cited

U.S. PATENT DOCUMENTS

| | | |
|---|---|---|
| 4,311,642 A | 1/1982 | Crescentini et al. |
| 5,169,870 A | 12/1992 | Corbin et al. |
| 5,294,384 A | 3/1994 | David et al. |
| 5,302,756 A | 4/1994 | McKinney |
| 5,310,905 A | 5/1994 | Moran, Jr. |
| 5,430,068 A | 7/1995 | Subramanian |
| 5,591,802 A | 1/1997 | David et al. |
| 5,668,277 A | 9/1997 | Hendrix et al. |
| 5,681,952 A | 10/1997 | Sifniades et al. |
| 5,859,071 A | 1/1999 | Young et al. |
| 5,898,063 A | 4/1999 | Stefandl |
| 6,756,412 B2 | 6/2004 | Muzzy |
| 2011/0207838 A1 | 8/2011 | Lima |

FOREIGN PATENT DOCUMENTS

| | | |
|---|---|---|
| DE | 4425615 | 1/1996 |
| WO | 2012024268 | 2/2012 |

OTHER PUBLICATIONS

Polymer-Plastics Technology and Engineering, vol. 38, No. 3, 1999.
Polymer Engineering and Science, Sep. 2001, vol. 41, No. 9, "Review: Recycling of Nylon From Carpet Waste".

*Primary Examiner* — Frances Tischler

(57) ABSTRACT

The present invention generally relates to polyamide compositions having improved anti-delamination. More specifically, the present invention relates to novel polyamide compositions demonstrating improved anti-delamination, which have at least one low purity polyamide.

19 Claims, No Drawings

POLYAMIDES HAVING IMPROVED ANTI-DELAMINATION

CROSS REFERENCE TO RELATED APPLICATIONS

This application claims priority to U.S. Provisional Application No. 61/706,254, filed Sep. 27, 2012.

FIELD OF THE INVENTION

The present invention generally relates to polyamide compositions having improved anti-delamination. More specifically, the present invention relates to novel polyamide compositions demonstrating improved anti-delamination, in which the compositions have at least one low purity polyamide.

BACKGROUND OF THE INVENTION

In an attempt to reduce waste and pollution associated with traditional methods for disposing of products containing polyamide resins, including polyamide 6 (PA6) and polyamide 66 (PA66), efforts have been made to recycle the resins for use in other products. For example, one source of waste is from post-consumer carpet, carpet scrap, and carpet fibers, which can contain a significant amount of PA6 and PA66. Traditionally the carpet waste has been disposed by either dumping it in landfills or by incineration. However, neither option is environmentally friendly since carpet waste is not biodegradable and can emit noxious fumes if incinerated. Accordingly, alternative methods for dealing with the waste have been designed. See, e.g., Carina Mihut et al., *Review: Recycling of Nylon From Carpet Waste*, Polymer Engineering and Science, Vol. 41, No. 9, September 2001.

One method for dealing with waste containing PA6 and PA66 involves depolymerizing the resins into their constituent monomers (i.e., caprolactam, and hexamethylenediamine and adipic acid, respectively). For example, the method described in U.S. Pat. No. 5,681,952 uses superheated steam at high pressures to depolymerize PA6. Other depolymerization methods use ammonia, acids, and bases. In particular, U.S. Pat. No. 5,302,756 discloses depolymerizing PA66 and PA6 by using ammonia at high temperatures and pressures, and optionally a phosphate catalyst. See also U.S. Pat. 5,668,227 (describes a continuous depolymerization process for PA66 and PA6 using ammonia at high temperatures and pressure). U.S. Pat. No. 5,169,870 describes a method for depolymerizing PA6 using phosphoric acid and superheated steam between 230° C. and 320° C. Moreover, U.S. Pat. Nos. 5,294,707; 5,310,905; and 5,468,900 disclose depolymerization processes using various acids, while U.S. Pat. Nos. 5,233,037; 5,266,694; and 6,087,494 use various basic catalysts.

Yet depolymerization processes have numerous drawbacks. To begin, the processes have to be conducted at very high temperatures using potentially caustic or hazardous materials. Further, the starting materials used in the depolymerization processes must generally contain low amounts of impurities. While this may not be problematic for relatively pure starting materials, many sources of waste, including post-consumer carpet, contain high levels of impurities (e.g., incompatible carpet constituents, dirt, cleaning chemicals, pet urine, etc.). In order to remove or reduce the impurities, an additional separating or recycling step is required before the depolymerization process. However, additional processing steps not only add to the complexity of the overall recycling process, but also add to the cost of the end product.

In order to avoid some of the problems associated with depolymerization processes, alternatively, solvent-based extraction methods can be used to recycle PA6 and PA66 from waste. U.S. Pat. No. 5,840,773 discloses an extraction process using aliphatic alcohols, preferably methanol and ethanol, at high temperatures. And U.S. Pat. 5,898,063 discloses a solvent-based process using glycerol to dissolve PA6 at 155° C. and PA66 at 195° C.

Nevertheless, like depolymerization processes, solvent-based methods for recycling PA6 and PA66 also have their drawbacks. In particular, the processes can use potentially harmful solvents. And like depolymerization processes, solvent-based methods can be costly and time consuming because of the required processing conditions. Moreover, and even more concerning, are the problems associated with the solvent itself. For instance, solvents can degrade the PA6 and PA66 polymer chains, which will affect the physical properties of the recycled product. Solvents can also dissolve a high amount of impurities along with the polyamide resins, which will negatively affect the properties of the end product. In this respect, picking the proper solvent or mixture of solvents for any given type of waste, and running the process under the proper conditions, can be difficult and expensive.

To overcome the deficiencies and problems associated with both solvent-based and depolymerization recycling processes for waste containing PA6 and PA66, blending methods have been developed. The blending processes typically involve melt blending either the entire waste product or part of the waste product into a recycled resin. However, because waste products usually contain components that are incompatible with PA6 and/or PA66, such as polyolefins and other polymers, compatibilizers generally have to be added to form a homogeneous resin. Typical compatibilizers include grafted olefinic polymers and copolymers, such as maleic anhydride grafted or acrylic acid grafted polypropylene homo- and copolymers. Additionally, because the polyamides are not completely separated from the incompatible compounds, the overall polyamide purity of the resins is much lower.

While blending processes generally excludes the drawbacks associated with depolymerization and solvent-based methods, nonetheless, other problems exist. For instance, products produced from the recycled resins can demonstrate inferior mechanical properties, especially when the resins have a low polyamide purity. In order to address the problems associated with mechanical underperformance, various fillers can be added, including glass fillers, and alkali metal and alkaline earth metal-based fillers.

Nevertheless, even though known fillers can help address problems generally related to mechanical and strength properties, and known compatibilizers can aid with homogenization issues for melt blending processes, blends including recycled polyamides, such as recycled PA6, PA66, or mixtures thereof, still exhibit problems with delamination. For example, delamination can occur between blends having recycled PA6, PA66, or mixtures thereof, or between a blend having recycled PA6, PA66, or mixtures thereof, and another polymer resin. Accordingly, there remains a need in the art for polyamide compositions that demonstrate improved anti-delamination, which have at least one low purity polyamide. There also remains a need in the art for a process for producing polyamide compositions that demonstrate improved anti-delamination, which have at least one low purity polyamide.

SUMMARY OF THE INVENTION

The present invention generally relates to novel polyamide compositions having improved anti-delamination. In this regard, an embodiment of the present invention relates to a polyamide composition having improved anti-delamination comprising:
(a) at least one low purity polyamide having a polyamide content of about 60 to less than 80 wt. %;
(b) at least one high purity polyamide composition having a polyamide content of 95 to 100 wt. %, selected from:
  (i) at least one virgin polyamide;
  (ii) at least one high purity recycled polyamide;
  (iii) or mixtures thereof; and
(c) an olefinic content having a heat of melting of about 3.2 J/g or less.

Another embodiment of the present invention relates to a polyamide composition having improved anti-delamination comprising:
(a) about 5 to about 30 wt. % of at least one low purity, post-consumer recycled polyamide 66;
(b) about 55 to about 85 wt. % of at least one high purity polyamide 66 composition selected from:
  (i) at least one virgin polyamide 66;
  (ii) at least one high purity, post-consumer recycled polyamide 66;
  (iii) or mixtures thereof;
(c) an olefinic content having a heat melting of 2.5 J/g or less; and
(d) about 5 to about 10 wt. % of at least one functionalized polyolefin;
wherein the weight percentages of (a), (b), (c), and (d) are based on a total weight of the polyamide composition.

Additionally, in yet another embodiment, the present invention relates to a process for producing a polyamide composition having improved anti-delamination,

DETAILED DESCRIPTION OF THE INVENTION

Definitions:

The term and phrases "invention," "present invention," "instant invention," and similar terms and phrases as used herein are non-limiting and are not intended to limit the present subject matter to any single embodiment, but rather encompass all possible embodiments as described.

As used herein, the term "about" means within 15% of the reported numerical value; in another embodiment, the term "about" means within 10% of the reported numerical value.

As used herein, the term "polyamide" can be abbreviated "PA." For example, poly(hexamethylene hexanediamide) is also known as polyamide 66, which can be abbreviated PA66.

As used herein, the phrase "olefinic content" means an amount of any olefin, polyolefin, or mixture thereof, including, but not limited to, any $C_2$-$C_{20}$ olefin, any $C_2$-$C_{20}$ polyolefin, and any combination or mixtures thereof. Additionally, the terms "olefin," "polyolefin," and the plural versions of the terms are used interchangeably herein.

As used herein, when a range is expressed as a numerical value of "at least," "at least about," or similar phrases, the range does not include 100% if such value would exclude a claimed component, or unless otherwise specified by indicating 100% is expressly included in the range.

As used herein, when a range is expressed as a numerical value "or less," "up to," or similar phrases, the range does not include zero if such value would exclude a claimed component, or unless otherwise specified by indicating zero is expressly included in the range.

As used herein, all weight percentages (wt. %) are based on the total wt. % of the polyamide composition with improved anti-delamination, unless otherwise specified. Additionally, all composition percentages are based on totals equal to 100 wt. %, unless otherwise specified.

Polyamide Compositions Having Improved Anti-Delamination:

The polyamide compositions herein provide an alternative to compositions composed completely of virgin polyamide resins, including virgin PA6, virgin PA66, or mixtures thereof, as well as compositions derived from depolymerization and solvent-based recycling processes. At the same time, the current polyamide compositions demonstrate improved anti-delamination properties.

As discussed above, increased demand in recycling waste containing polyamide resins, such as PA6 and PA66, as opposed to merely dumping or incinerating it has led to several recycling processes, all of which have their drawbacks. In particular, in order to stop using the hazardous and potentially toxic materials associated with depolymerization and solvent-based recycling processes, melt blending recycling processes have been developed. However, melt blending processes also have their drawbacks, including producing resins and products that exhibit inferior physical properties, including substandard delamination properties. This problem increases when polyamides having a low polyamide purity, and therefore, a high if purity content, are recycled by melt blending for use in injection molding processes.

Surprisingly, it has been found that by using at least one low purity polyamide along with at least one high purity polyamide composition, the resulting polyamide composition demonstrates improved anti-delamination properties when the polyamide composition has an olefinic content with a heat of melting of about 3.2 J/g or less.

Low Purity Polyamide:

One benefit of the instant invention is that any type of low purity polyamide can be used. In this respect, preferably the low purity polyamides can have a polyamide content of about 60 to less than 80 wt. %. The remaining weight percentage can include a variety of materials, including, but not limited to olefins, polyolefins, fillers, rubbers, adhesives, additives, colorants, and mixtures thereof. The polyamide content of the low purity polyamide can be determined by any method generally available in the art. For example, the polyamide content can be determined by a combustion method, in which a sample of the polyamide is combusted at 850-950° C., and the quantity of $N_2$ gas produced is analyzed and compared to the nitrogen content of a virgin or pure polyamide sample. See, e.g. U.S. Patent Application Publication 201110207838, which is incorporated herein by reference in its entirety.

Additionally, the low purity polyamide can be derived from any source, including, but not limited to, post-manufactured carpet, post-consumer carpet, carpet fibers, scrap, filaments, molded parts, post-consumer goods, post-industrial parts, and combinations thereof. The low purity polyamide can also be derived from a recycling process, and therefore, can be a recycled polyamide. In particular embodiments in which the low purity polyamide is derived at least in part from post-consumer material, the polyamide is referred to as a "post-consumer recycled (PCR) polyamide." In a preferred embodiment, the low purity polyamide is derived at least in part from a PCR polyamide. In a particularly preferred embodiment, the low purity polyamide is derived from at least 50% of PCR polyamide. And in yet another embodiment, the low purity polyamide is derived from at least 90% up to 100% of PCR polyamide.

The low purity polyamide can include a wide variety of polyamides, including, but not limited to PA6 (poly(caprolactam)), PA66 (poly(hexamethylene hexanediamide)), PA610 (poly(hexamethylene decanediamide)), PA612 (poly (hexamethylene dodecanediamide)), PA1010 (poly(decamethylene decanediamide)), PA1012 (poly(decamethylene dodecanediamide), and mixtures thereof. In this respect, any polyamide or combination of polyamides derived from diamines having 6 to 12 carbons, and dicarboxylic acids having 6 to 16 carbons, can be used. In preferred embodiments, the low purity polyamide can comprise PA6, PA66, or mixtures thereof, and in even more preferred embodiments, the low purity polyamide can comprise about 60 to less than 80 wt. % of PA6, PA66, or mixtures thereof. Moreover, in certain embodiments, the low purity polyamide can be a PCR polyamide comprising about 60 to less than 80 wt. % of PA6, PA66, or mixtures thereof.

With respect to the current polyamide compositions, preferably the compositions can comprise 30 wt. % or less of the low purity polyamide, excluding zero wt %. In more preferred embodiments, the polyamide compositions can comprise about 5 to about 30 wt. %, and more preferably about 10 to about 30 wt. %, of the low purity polyamide.

High Purity Polyamide:

Similar to the type of low purity polyamides that are useful in the instant invention, any type of high purity polyamide can be used. Preferred high purity polyamides useful in the instant polyamide compositions can be selected from at least one virgin polyamide, at least one high purity recycled polyamide, or mixtures thereof. In this respect, the high purity polyamide can have a polyamide content from 95 to 100 wt. %. In embodiments in which the polyamide content is less than 100 wt. %, the remaining weight percentage can include a variety of materials, including, but not limited to olefins, polyolefins, fillers, rubbers, adhesives, additives, colorants, and mixtures thereof. Further, the polyamide content of the high purity polyamide can be determined by any method generally available in the art, including the method described above.

Virgin polyamides useful in the instant polyamide compositions can be derived directly from the polymerization of the polyamide monomers, and can be a commercial grade material. Accordingly, the virgin polyamide preferably has a polyamide content of 95 to 100 wt. %, and more preferably has a polyamide content of 98 to 100 wt. %.

As for the high purity recycled polyamide, like the low purity polyamide, the polyamide can be derived from any source, including, but not limited to, post-manufactured carpet, post-consumer carpet, carpet fibers, scrap, filaments, molded parts, post-consumer goods, post-industrial parts, and combinations thereof. However the high purity recycled polyamide preferably has a polyamide content of 95 to 100 wt. %, and more preferably has a polyamide content of 98 to 100 wt. %.

In embodiments in which the high purity polyamide includes at least one high purity recycled polyamide, the recycled polyamide can be derived, at least in part, from post-consumer material. In such a case, the polyamide is referred to as a "post-consumer recycled (PCR) polyamide." In a preferred embodiment, the high purity recycled polyamide is derived at least in part from a PCR polyamide. In a particularly preferred embodiment, the high purity recycled polyamide is derived from at least 50% of PCR polyamide. And in yet another embodiment, the high purity recycled polyamide is derived from at least 90% up to 100% of PCR polyamide.

The high purity polyamide, including the virgin polyamide, high purity recycled polyamide, high purity post-consumer recycled polyamides, and mixtures thereof can include a wide variety of polyamides, including, but not limited to PA6 (poly(caprolactam)), PA66 (poly(hexamethylene hexanediamide)), PA 610 (poly(hexamethylene decanediamide)), PA612 (poly(hexamethylene dodecanediamide)), PA1010 (poly(decamethylene decanediamide)), PA1012 (poly(decamethylene dodecanediamide), and mixtures thereof. In this respect, any polyamide or combination of polyamides derived from diamines having 6 to 12 carbons, and dicarboxylic acids having 6 to 16 carbons, can be used.

In preferred embodiments, the high purity polyamide, virgin polyamide, and/or high purity recycled polyamide, including high purity post-consumer recycled polyamides, can comprise PA6, PA66, or mixtures thereof. In more preferred embodiments, the high purity polyamide, virgin polyamide, and/or high purity recycled polyamide, including high purity post-consumer recycled polyamides, can comprise about 95 to 100 wt. % of PA6, PA66, or mixtures thereof. Moreover, in certain embodiments, the high purity polyamide can comprise at least one high purity, post-consumer recycled polyamide (PCR) comprising about 95 to 100 wt. % of PA6, PA66, or mixtures thereof.

The current polyamide compositions can preferably comprise at least 50 wt. %, and more preferably at least 55 wt. %, of the high purity polyamide, excluding 100 wt. %. In yet other preferred embodiments, the polyamide compositions can comprise about 50 to 95 wt. %, and r yore preferably about 55 to 85 wt. %, of the high purity polyamide.

Alternatively, or in addition to the high purity polyamide, virgin polyamide, and/or high purity recycled polyamide, including high purity post-consumer recycled polyamides, the instant polyamide compositions can have at least one medium purity polyamide. Useful medium purity polyamides can have a polyamide content from 80 to less than 95 wt. %. As with the high purity polyamide and low purity polyamide, the remaining weight percentage can include a variety of materials, including those listed above, and the polyamide content can be determined by any method, including those previously mentioned.

Additionally, the medium purity polyamide can be derived from any source, including those mentioned above in exemplary fashion for the high purity polyamide, virgin polyamide, and/or high purity recycled polyamide, including high purity post-consumer recycled polyamides, as well as for the low purity polyamide. This includes, without limitation, that the medium purity polyamide can be derived, at least in part, from a PCR polyamide, and can include the polyamides described above, including any polyamide or combination of polyamides derived from diamines having 6 to 12 carbons, and dicarboxylic acids having 6 to 16 carbons.

As for the weight content of the medium purity polyamides, if at least one medium purity polyamide is used in lieu of the high purity polyamide, virgin polyamide, and/or high purity recycled polyamide, including high purity post-consumer recycled polyamides, then preferably the instant compositions can comprise at least about 65 wt. %, and more preferably at least about 70 wt. %, of the medium purity polyamide, excluding 100 wt. %. In yet other preferred embodiments, if at least one medium purity polyamide is used in lieu of the high purity polyamide, virgin polyamide, and/or high purity recycled polyamide, including high purity post-consumer recycled polyamides, then the polyamide compositions can comprise about 65 to about 95 wt. %, and more preferably about 70 to about 90 wt. %, of the medium purity polyamide.

If at least one medium purity polyamide is used in addition to the high purity polyamide, virgin polyamide, and/or high purity recycled polyamide, including high purity post-consumer recycled polyamides, then preferably the instant compositions can comprise anywhere from about 0 to about 87 wt, %, and more preferably at least about 15 to about 87 wt. %, of the medium purity polyamide.

Olefinic Content:

As discussed above, it has been surprisingly determined that when the polyamide composition comprises both at least one high purity polyamide and at least one low purity polyamide, as well as an olefinic content having a heat of melting of about 3.2 J/g or less, the resulting polyamide composition exhibits superior anti-delamination properties. In this respect, the olefinic content in the end polyamide composition can be from any source, including from the low purity polyamide, from the high purity polyamide, from a medium purity polyamide, from another source, or from any combination thereof.

In particular, the low purity polyamide will generally contain constituents other than a polyamide, or mixtures of polyamides. For instance, the low purity polyamide can contain, among other things, olefins and polyolefins, which can contribute to the overall olefinic content in the end polyamide composition. As a non-limiting example, a low purity polyamide may contain an olefinic content because the olefins and/or polyolefins may not have been removed during a recycling process, and therefore, the olefins and/or polyolefins may be included in the low purity polyamide. Nevertheless, a low purity polyamide may contain an olefinic content for other reasons than the example above, including, but not limited to, other resins blended with the low purity polyamide, additives, fillers, and mixtures thereof.

Similar to the low purity polyamide, the high purity polyamide can also contain constituents other than a polyamide, or mixtures of polyamides, including olefins, polyolefins, or mixtures thereof; however, generally the amount of olefins and/or polyolefins in the high purity polyamide will be less than the amount in the low purity polyamide. In this respect, in a preferred embodiment, the high purity polyamide can have an olefinic content of 5 wt. % or less, including zero wt. %. In a more preferred embodiment, the high purity polyamide can have an olefinic content of about 2.5 wt. % or less, including zero wt. %, and in another preferred embodiment, the high purity polyimide can have an olefinic content of about 1 wt. % or less, including zero wt. %.

As for the overall olefinic content in the polyamide compositions of the instant invention, the compositions can preferably have an olefinic content of about 7 wt. % or less, and more preferably about 6.7 wt. % or less, excluding zero wt. %. In yet other preferred embodiments, the polyamide compositions can have an olefinic content of about 1 to 7 wt. %, and more preferably about 1.3 to about 6.7 wt. %.

In addition to the overall wt. % of the olefinic content in the polyamide compositions, as discussed above, when the olefinic content has a heat of melting of about 3.2 J/g or less, the polyamide compositions exhibit superior anti-delamination properties. In more preferred embodiments, the olefinic content can have a heat of melting of 3.0 J/g or less, and in even more preferred embodiments, the heat of melting can be 2.5 J/g or less. In other embodiments, the olefinic content can have a heat of melting of about 1 J/g to about 3.2 J/g, more preferably about 1 J/g to about 3.0 J/g, and most preferably about 1 J/g to about 2.5 J/g.

The heat of melting can be determined by the method described below in the Test Methods. Furthermore, the heat of melting of the olefinic content can be adjusted to the desired value in a variety of ways, none of which are limitations hereupon. As non-limiting examples, the heat of melting can be adjusted to a desired level by adjusting the olefinic amount in the polyamide compositions, as well as adjusting the amount of constituents other than the polyamide content in the end polyamide compositions.

Functionalized Polyolefin:

The polyamide composition can further comprise at least one functionalized polyolefin. In this respect, the functionalized polyolefin can include any polymer, copolymer, terpolymer, or combination thereof. In preferred embodiments, the functionalized polyolefin can be selected from the group consisting of ethylene/α-olefin copolymers grafted with an acid or anhydride; ethylene/α-olefin/diene terpolymers grafted with an acid or anhydride; block polymers, including but not limited to styrene/ethylene-butylene/styrene triblock (SEBS) grafted with an acid or anhydride; acid copolymers, and combinations thereof.

Suitable α-olefins can include any linear or branched $C_2$-$C_{20}$ α-olefin. Non-limiting examples include ethylene, propylene, 1-butene, 1-pentene, 1-hexene, 1-heptene, 1-octene, and mixtures thereof. In lieu of an α-olefin, other monomers can be used, including aromatic monomers, such as styrene. Additionally, suitable acids and anhydrides for grafting the functionalized polyolefin include, but are not limited to acrylic acid and maleic anhydride. The functionalized polyolefin can have up to 10 wt. %, preferably up to 5 wt. %, excluding zero wt. %, of the grafting acid or anhydride.

Acid copolymers useful in the polyamide compositions include polymers having copolymerized units of at least one $C_2$-$C_{20}$ α-olefin, at least one α,β-ethylenically unsaturated carboxylic acid, and other comonomer(s) including, but not limited to, at least one α,β-ethylenically unsaturated carboxylic acid esters. In certain embodiments, the acid copolymer can have about 2 to about 30 wt. %, more preferably about 5 to about 25 wt. %, and most preferably about 10 to about 25 wt. % of copolymerized units of a $C_3$-$C_{10}$ α,β-ethylenically unsaturated carboxylic acid, based on the total weight of the acid copolymer.

Suitable α,β-ethylenically unsaturated carboxylic acid comonomers can include, but are not limited to, (meth)acrylic acids, itaconic acids, maleic acids, maleic anhydrides, fumaric acids, monomethyl maleic acids, and mixtures thereof. Preferably, the α,β-ethylenically unsaturated carboxylic acid is selected from (meth)acrylic acid.

The acid copolymers may further comprise copolymerized units of other comonomer(s), such as unsaturated $C_2$-$C_{10}$ carboxylic acids, or derivatives thereof, as listed in U.S. Patent Application Publication 2011/0207838.

In particularly preferred embodiments, the functionalized polyolefin can be a grafted α-olefin homopolymer, a grafted ethylene/α-olefin copolymer, a grafted ethylene/α-olefin/diene terpolymer, or mixtures thereof. The copolymer and terpolymer can have at least 40 wt. % of ethylene, excluding 100 wt. %. In yet other particularly preferred embodiments, the functionalized polyolefin can be a grafted propylene homopolymer, a grafted ethylene/1-octene copolymer, a grafted ethylene propylene copolymer, a grafted ethylene/butene copolymer, a grafted ethylene/propylene/diene terpolymer (EPDM), or mixtures thereof.

The instant polyamide compositions can preferably have about 3 to about 15 wt. %, more preferably about 5 to about 12 wt. %, and even more preferably about 5 to about 10 wt. % of the functionalized polyolefin.

The polyamide compositions can also have various additives, fillers, colorants, and mixtures thereof, that are known in the art. For example, the compositions can include up to about 10 wt. %, including zero wt. %, of fillers; mold release agents, such as aluminum stearate; flow enhancers, such as phthalic anhydride, adipic acid, terephthalic acid, and mixtures thereof; thermal stabilizers, such as potassium halides/copper halides/aluminum stearate blends, calcium fluoride, copper compounds, hindered phenols, and mixtures thereof;

antistatic agents; blow-molding agents; lubricants; plasticizers; colorants; pigments; and combinations thereof.

The polyamide compositions can further have at least one glass filler, carbon fiber filler, or mixtures thereof. In particular embodiments, the polyamide compositions can preferably have about 50 wt. % or less, more preferably about 45 wt. % or less, and most preferably about 40 wt. % or less, of at least one glass filler, carbon fiber filler, or mixtures thereof. In yet other preferred embodiments, the polyamide compositions can have about 1 to about 50 wt. %, more preferably about 10 to about 45 wt. %, and most preferably about 20 to about 40 wt. % of at least one glass filler, carbon fiber filler, or mixtures thereof.

Further, in certain embodiments the polyamide compositions can have up to 13 wt. % of impurities, including zero wt. %, and up to about 8 wt. %, more preferably up to about 5 wt. %, including zero wt. %, of ash. Moreover, in other embodiments the polyamide compositions can have an overall polyamide content of 76 wt. % or greater, more preferably 78 wt. % or greater. Even more preferably the compositions can have a polyamide content from 76 to 97 wt. %. The overall polyamide content value is equivalent to the polyamide purity in the end polyamide compositions, and can be determined using the method described in U.S. Patent Application Publication 2011/0207838.

In other embodiments, the polyamide compositions can also have a polyamide content in the polyamide fraction (PAF) of 84 wt. % or greater, more preferably 87 wt. % or greater. Even more preferably the compositions can have a polyamide content in the PAF from 87 to 97 wt. %. The polyamide content in the PAF is equivalent to the polyamide purity in the fraction containing only the high purity polyamide, low purity polyamide, medium purity polyamide, if applicable, and mixtures thereof. The polyamide content in the PAF can be determined using the same method discussed above for determining the overall polyamide content.

Processes for Making the Polyamide Compositions Having Improved Anti-Delamination:

The polyamide compositions having improved anti-delamination disclosed herein can be made by mixing the components in a melt-blending process, in which the polymer components are blended together, and the non-polymer components are dispersed in the polymer matrix. Any melt-blending process can be used. For example, polymeric components and non-polymeric components can be fed into a mixer, such as a single screw extruder or a twin screw extruder, agitator, single screw or twin screw kneader, or Banbury mixer. Further, the components can be added all at once or in gradual batches. In a batch process, in which the polymeric components and non-polymeric components are added gradually in batches, part of the polymeric components and/or non-polymeric components are added in a first melt-mixing step, and then additional polymeric and non-polymeric components are subsequently added until an adequately melt-blended mix composition is obtained. The melt-blended mix is then extruded through a die to provide strands, which can then be chopped into pellets.

In a preferred embodiment, a polyamide composition having improved anti-delamination can be produced by melt blending at least one low purity polyamide with at least one high purity polyamide composition, the high purity polyamide composition being selected from (i) at least one virgin polyamide; (ii) at least one high purity recycled polyamide; (iii) or mixtures thereof; and optionally, at least one functionalized polyolefin, wherein the polyamide composition has an olefinic content with a heat of melting of about 3.2 J/g or less, determined by measuring the heat of melting by differential scanning calorimetry (DSC).

And in yet another preferred embodiment, a polyamide composition having improved anti-delamination can be produced by melt blending at least one high purity recycled polyamide, or at least one high purity recycled polyamide and at least one virgin polyamide, with optionally, at least one functionalized polyolefin, wherein the polyamide composition has an olefinic content with a heat of melting of about 3.2 J/g or less, determined by measuring the heat of melting by DSC.

The polyamide compositions of the present invention can also be used in molding processes to form various articles. Preferred molding processes include, but are not limited to injection molding processes, blow molding processes, and extrusion processes. Injection molding processes, and articles formed from injection molding processes are particularly preferred.

EXAMPLES

The following examples are illustrative of preferred polyamide compositions having improved anti-delamination, and are not intended to be limitations thereon. An product composition percentages are based on totals equal to 100% by weight, unless otherwise specified.

Test Methods:

KAY-1C, Pa·s, ("Apparent Melt Viscosity"): measured by ASTM 3835.

Heat of melting, J/g, of the olefinic phase: measured by differential scanning calorimetry (DSC). Three (3) to six (6) mg of the pelletized polyamide composition was placed in a DSC pan, and closed by crimping. Over crimping the DSC pan (i.e., rounding the bottom of the sample pan) should be avoided. The temperature profile for the DSC included an equilibrium step at 25° C., followed by a two (2) minute isothermal hold. The DSC was then ramped at 10° C./min. from 25° C. to 325° C., with two (2) minute isothermal holds between each ramping step, so that the DSC process is as follows:

Step 1: heat the sample in the DSC pan to 325° C.;
Step 2: isothermal hold for two (2) minutes;
Step 3: cool the sample in the DSC pan to 25° C.;
Step 4: isothermal hold for two (2) minutes; and
Step 5: reheat the sample in the DSC pan to 325° C.

In the reheat step, a linear baseline can be drawn anywhere from between about 100° C. to 200° C. The linear baseline for the polyamide compositions tested was drawn between 140° C. to 171° C. Thereafter, the area between the melting endotherm and the baseline should be integrated to determine the heat of melting in J/g.

Delamination: measured by a cut and peel method. To begin, a molded part is made. For this test, an injection molded fuel tank having the following dimensions was produced using a Nissei FN2000 machine at around 275-280° C.:
Length: 9"
Width: 4⅞"
Height: 2⅛"

Once the part is removed from the mold and has cooled, a knife is used to cut four (4) horizontal and four (4) vertical lines into the part to form a crisscrossing pattern with nine (9) complete squares at the injection molding site. Four (4), three inch (3") horizontal lines and four (4), two inch (2") vertical lines were cut into the molded fuel tank at a depth of 0.00055", and were spaced in 5/16" intervals. Next, a piece of adhesive tape is placed over the crisscrossing lines and firmly affixed to ensure no air bubbles are present. The adhesive tape is allowed to set on the part for one (1) minute, and then the tape is peeled off as quickly as possible. The tape should meet ASTM D5486 Type IV Class 1, and should provide an adhesion strength to steel of 75-85 oz/in., preferably about 80 oz/in., according to PSTC-101. Polyken® 231 Premium Military Grade Duct Tape, available from Berry Plastics Corporation, Franklin, Mass. 02038, was used to test the delamination properties of the molded fuel tank.

Parts having poor delamination properties (i.e., high delamination occurs) will have at least two squares removed from the part. Parts having medium delamination properties (i.e., medium delamination occurs) will have one square removed from the part. Parts having good delamination (i.e., no delamination) will show no difference in appearance after the test is performed.

Impurities: measured by the following formula:

$$\text{impurities (wt. \%)} = (1) + (2), \quad \quad A)$$

wherein:
(1) is the olefinic content wt. %, which is described below; and
(2) is the wt. % of other components in the PCR material, which is measured by the ash content method described below.

Ash content: measured by heating a sample of the polyamide composition for 25 min. at 600° C. The weight percent left after heating is the ash content.

Olefinic content: measured by the following formula:

$$\text{olefinic content (wt. \%)} = 100 - (2) - (3) - (4), \quad \quad B)$$

wherein:
(2) is the wt. % of other components in the composition, which is measured by the ash content method:
(3) is the overall polyamide wt. % in the composition, which is measured by the overall polyamide purity method described below; and
(4) is the amount of carbon black, which is 2.00 for the Examples and Comparative Examples in Table 1.

Notched Charpy at 23° C., $KJ/m^2$: measured by ISO 179.

Overall polyamide purity: determined by directly measuring the amount of nitrogen in the overall polyamide sample and other materials. See U.S. Patent Application Publication 2011/0207838. This measures the amount of polyamide in the overall composition.

To determine the nitrogen % in any given sample of PA66, the calculation is based on the nitrogen content of pure or virgin PA66, which theoretically is 12.38 wt. %. An example of a pure or virgin PA66 standard is the Zytel® 101 resin, which is available from E. I. Du Pont de Nemours & Co. Inc., Wilmington, Del., USA. This calculation method can be used to report results as the wt. % polyamide (i.e., the polyamide purity of the sample), and/or the wt. % of nitrogen (i.e., the nitrogen content of the sample).

Pellets of the polyamide composition are combusted in a LECO furnace at 850-950° C. Combustion gases are filtered, water vapor is removed, and nitrogen oxides are reduced to $N_2$ gas in the reduction furnace. A thermal conductivity detector is used to quantify the amount of $N_2$ gas produced. Additionally, the detector is standardized using the characteristics of pure or virgin PA66 pellets. Since rubber tougheners and other non-polyamide compounds do not contribute nitrogen, the measured decrease in detected nitrogen relative to the base polyamide standard is proportional to non-polyamide content concentration.

The purity of other polyamides can also be determined in a similar fashion. For instance, if the purity of a polyamide composition having PA610 is desired, the ne method can be used, except a pure or virgin sample of PA610 should be used as the standard.

Polyamide Fraction (PAF) purity: determined by the same method used for determining the overall polyamide purity. However, instead of measuring the overall polyamide purity by testing a sample of the overall composition, the purity of the PAF is determined by testing a sample having only the High Purity PCR and Low Purity PCR.

Materials:

"High Purity PCR" refers to a high purity, post-consumer recycled polyamide 66 (PA66) having a PA66 purity of 95 wt. %, based on the polyamide purity test above. The High Purity PCR is derived from post-consumer recycled carpet, and is available from Shaw Industries Group, Inc., Dalton, Ga. 30720.

"Low Purity PCR" refers to a low purity, post-consumer recycled polyamide. 66 (PA66) having a PA66 purity of 66 wt. %, based on the polyamide purity test above. The Low Purity PCR is derived from post-consumer recycled carpet, and is available from Columbia Recycling Corp., Dalton, Ga. 30720.

"FPO" refers to an ethylene/1-octene copolymer grafted with maleic anhydride available from E. I. Du Pont de Nemours & Co. Inc., Wilmington, Del., USA. The graft amount is 1.9 wt. %.

"Carbon Black w/ZYT 101" refers to ZTYFE310003, a carbon black concentrate available from E. I. du Pont de Nemours & Co Inc. (Wilmington, Del., USA).

"KBR" refers to a thermal stabilizer mixture containing 7 parts of potassium bromide, 1 part of copper iodide, and 0.5 parts of aluminum stearate, "Al. St." refers to aluminum stearate.

Example 1

The components listed in Table 1 were fed to the rear of a 58 mm co-rotating twin screw extruder fitted with a moderately hard working screw run at 300-500 rpms and a 400-500 lb/hr feed rate. The barrel temperatures were set between 220-300° C., with the initial barrels set at 220° C., and the barrels at the die were set to 300° C. The compositions were pelletized after leaving the extruder. After drying the pellets overnight using a nitrogen bleed, some pellets were used to mold ISO bars, using a Sumitomo (SHI) Demag machine at around 290° C., for the Notched Charpy test at 23° C. The bars were vacuum sealed in a foil-lined plastic bag to preserve them in dry-as-molded (DAM) condition until they were cut and after conditioned according to ISO 179.

The other pellets were used to test the KAY-1C, heat of melting, ash content, olefinic content, and overall polyamide purity, as well as to produce molded parts for the delamination test described above. The impurities content was calculated using the method above.

Example 1 contains 77.56 wt. % of a high purity, post-consumer recycled polyamide 66; 9.59 wt. % of a low purity, post-consumer recycled polyamide 66; 8.00 wt. % of a functionalized polyolefin; 4.45 wt. % of a carbon black concentrate mixture; 0.3 wt. % of a thermal stabilizer mixture; and 0.1 wt. % of aluminum stearate.

Example 2

The composition was prepared in the same manner as Example 1. Example 2 contains 67.97 wt. % of a high purity, post-consumer recycled polyamide 66; 19.17 wt. % of a low purity, post-consumer recycled polyamide 66; 8.00 wt. % of a functionalized polyolefin; 4.45 wt. % of a carbon black concentrate mixture; 0.3 wt. % of a thermal stabilizer mixture; and 0.1 wt. % of aluminum stearate.

Example 3

The composition was prepared in the same manner as Example 1. Example 3 contains 58.39 wt. % of a high purity, post-consumer recycled polyamide 66; 28.76% of a low purity, post-consumer recycled polyamide 66; 8.00 wt. % of a functionalized polyolefin; 4.45 wt. % of a carbon black concentrate mixture; 0.3 wt. % of a thermal stabilizer mixture; and 0.1 wt. % of aluminum stearate.

Comparative Example

The composition was prepared in the same manner as Example 1. Comparative Example 1 contains 48.78 wt. % of a high purity, post-consumer recycled polyamide 66; 38.37 wt. % of a low purity, post-consumer recycled polyamide 66; 8.00 wt. % of a functionalized polyolefin; 4.45 wt. % of a carbon black concentrate mixture; 0.3 wt. % of a thermal stabilizer mixture; and 0.1 wt. % of aluminum stearate.

Comparative Example 2

The composition was prepared in the same manner as Example 1. Comparative Example 2 contains 48.78 wt. % of a high purity, post-consumer recycled polyamide 66; 38.32 wt. % of a low purity, post-consumer recycled polyamide 66; 8.00 wt. % of a functionalized polyolefin; 4.45 wt. % of a carbon black concentrate mixture; 0.3 wt. % of a thermal stabilizer mixture; and 0.1 wt. % of aluminum stearate.

TABLE 1

|  | Ex. 1 | Ex. 2 | Ex. 3 | CE. 1 | CE. 2 |
| --- | --- | --- | --- | --- | --- |
| High Purity PCR | 77.56 | 67.97 | 58.39 | 48.78 | 48.78 |
| Low Purity PCR | 9.59 | 19.17 | 28.76 | 38.37 | 38.32 |
| FPO | 8 | 8 | 8 | 8 | 8 |
| Carbon Black w/ZYT101 | 4.45 | 4.45 | 4.45 | 4.45 | 4.45 |
| KBR | 0.3 | 0.3 | 0.3 | 0.3 | 0.3 |
| Al. St. | 0.1 | 0.1 | 0.1 | 0.1 | 0.1 |
| KAY-1C (Pa · s) | 80 | 91 | 98 | 103 | 101 |
| Heat of Melting (J/g) | n.d.* | 1.8 | 2.5 | 3.6 | 4.0 |
| Delamination | None | None | None | High | High |
| Impurities (wt. %) | 6 | 9 | 11 | 15 | 15 |
| Ashes (wt. %) | 2.4 | 3.7 | 4.8 | 6 | 6.2 |
| Olefinic Content (wt. %) | 3.2 | 5.2 | 6.7 | 8.9 | 8.8 |
| Notched Charpy at 23° C. (KJ/m²) | 8.3 | 7.7 | 7.8 | 7.6 | 5.9 |
| PAF Polyamide Purity (wt. %) | 94 | 90 | 87 | 83 | 83 |
| Overall Polyamide Purity (wt. %) | 84.4 | 81.1 | 78.5 | 75.1 | 75.0 |

*The term "n.d." means "not detected."

Examples 1-3 show that polyamide compositions having a combination of at least one low purity polyamide and at least one high purity polyamide composition, in which the polyamide composition has an olefinic content with a heat of melting of about 3.2 J/g or less, demonstrate superior anti-delamination properties versus similar compositions, but wherein the olefinic content has a heat of melting higher than about 3.2 J/g.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

I claim:

1. A polyamide composition having improved anti-delamination comprising:
    (a) about 5 30 wt. % of at least one low purity polyamide having a polyamide content of about 60 to less than 80 wt. %;
    (b) about 50 to about 95 wt. % of at least one high purity polyamide composition having a polyamide content of 95 to 100 wt. %, selected from:
        (i) at least one virgin polyamide;
        (ii) at least one high purity recycled polyamide;
        (iii) or mixtures thereof; and
    (c) a polypropylene content having a heat of melting of about 1 to about 3.2 J/g or less;
    wherein the weight percentages are based on a total weight of the polyamide composition;
    wherein the polyamide composition has an overall poylamide content of 76 wt. % or greater; and
    wherein no visible delamination of a part molded from the polyamide composition occurs.

2. The polyamide composition of claim 1, wherein the low purity polyamide is a post-consumer recycled (PCR) polyamide.

3. The polyamide composition of claim 1, wherein the high purity recycled polyamide is a post-consumer recycled (PCR) polyamide.

4. The polyamide composition of claim 1, wherein the low purity polyamide comprises about 60 to less than 80 wt. % of polyamide 6, polyamide 66, or mixtures thereof.

5. The polyamide composition of claim 1, wherein the high purity polyamide comprises 95 to 100 wt. % of polyamide 6, polyamide 66, or mixtures thereof.

6. The polyamide composition of claim 1, wherein the olefin content has a heat of melting of 2.5 J/g or less.

7. The polyamide composition of claim 1 further comprising (d) at least one functionalized polyolefin selected from a grafted propylene homopolymer, a grafted ethylene/1-octene copolymer, a grafted ethylene/propylene copolymer, a grafted ethylene/butene copolymer a grafted ethylene/propylene/diene terpolymer (EPDM),or mixtures thereof.

8. The polyamide composition of claim 7, wherein the functionalized polyolefin is grafted with maleic anhydride.

9. The polyamide composition of claim 1, wherein the olefinic content is about 7 wt. % or less.

10. The polyamide composition of claim 1, wherein the olefinic content is about 1.3 to about 6.7 wt. %.

11. The polyamide composition of claim 1 comprising about 10 to about 30 wt. % of the low purity polyimide.

12. The polyamide composition of claim 1 comprising about 55 to about 85 wt. % of the high purity polyamide composition.

13. The polyamide composition of claim 7 comprising about 5 to about 12 wt. % of the functionalized polyolefin.

14. A polyamide composition having improved anti-delamination comprising:
    (a) about 5 to about 30 wt. % of at least one low purity, post-consumer recycled polyamide 66;
    (b) about 55 to about 85 wt. % of at east one high purity polyamide 66 composition selected from:
        (i) at least one virgin polyamide 66;
        (ii) at least one high purity, post-consumer recycled polyamide 66;
        (iii) or mixtures thereof;

(c) a polypropylene content having a heat of melting of about 1 to 2.5 J/g or less; and (d) about 5 to about 10 wt. % of at least one functionalized polyolefin;

wherein the weight percentages of (a), (b), (c), and (d) are based on a total weight of the polyamide composition;

wherein the polyamide composition has an overall polyamide content of 76 wt. % or greater; and wherein no visible delamination of a part molded from the polyamide composition occurs.

15. A process for producing a polyamide composition according to claim 1 with improved anti-delamination, the process comprising:

adding up to 30 wt. % of (a) at least one low purity polyamide to at least 50 wt. % of (b) at least one high purity polyamide composition selected from (i) at least one virgin polyamide; (ii) at least one high purity, post-consumer recycled polyamide; (iii) or mixtures thereof; and optionally, up to about 12 wt. % of (c) a functionalized polyolefin, wherein the polyamide composition has an olefinic content with a heat of melting of about 3.2 J/g or less, determined by measuring the heat of melting by differential scanning calorimetry (DSC), and the weight percentages of (a), (b), and (c) are based on a total weight of the polyamide composition.

16. The process of claim 15, wherein the low purity polyamide is melt blended with the high purity polyamide composition.

17. The process of claim 15, wherein the polyamide composition is extruded or injection molded to form at least one article.

18. The polyamide composition of claim 1 further comprising about 10 to about 45 wt. % of at least one glass filler, carbon fiber filler, or mixtures thereof.

19. The polyamide composition of claim 1 further comprising about 20 to about 40 wt. % of at least one glass filler, carbon fiber filler, or mixtures thereof.

* * * * *